(12) United States Patent
Forstner et al.

(10) Patent No.: US 10,989,338 B2
(45) Date of Patent: Apr. 27, 2021

(54) HOSE ARRANGEMENT

(71) Applicants: Mahle International GmbH, Stuttgart (DE); Averis GmbH, Fellbach (DE)

(72) Inventors: Michael Forstner, Fellbach (DE); Pierre-Yves Guiton, Aichwald (DE); Sven Alexander Kaiser, Waiblingen (DE); Samuel Kohler, Weil im Schoenbuch (DE); Parzani Massimo, Sarnico (IT); Katrin Schindele, Baiersbronn (DE); Georg Votteler, Backnang (DE)

(73) Assignees: Mahle International GmbH; Averis GmbH

( * ) Notice: Subject to any disclaimer, the term of this patent is extended or adjusted under 35 U.S.C. 154(b) by 56 days.

(21) Appl. No.: 16/419,575

(22) Filed: May 22, 2019

(65) Prior Publication Data

US 2019/0360617 A1 Nov. 28, 2019

(30) Foreign Application Priority Data

May 23, 2018 (DE) ...................... 10 2018 208 123.9

(51) Int. Cl.
*F16L 11/11* (2006.01)
*F16L 11/112* (2006.01)
(Continued)

(52) U.S. Cl.
CPC ........ *F16L 11/112* (2013.01); *B60H 1/00557* (2013.01); *F16L 11/121* (2013.01); *F16L 51/025* (2013.01); *B29L 2023/18* (2013.01)

(58) Field of Classification Search
CPC .......... F16L 11/15; F16L 11/11; F16L 11/115; F16L 11/00
(Continued)

(56) References Cited

U.S. PATENT DOCUMENTS 7,147,007 B2 12/2006 Renaud
7,314,066 B2 * 1/2008 Castillo ..................... C22B 3/02
138/114

(Continued)

FOREIGN PATENT DOCUMENTS

DE 2529508 A1 * 1/1977 .............. F16L 11/15
DE 60129019 T2 2/2008
(Continued)

OTHER PUBLICATIONS

English abstract for DE-20 2013 100 893, May 22, 2019.

*Primary Examiner* — Patrick F Brinson
(74) *Attorney, Agent, or Firm* — Fishman Stewart PLLC

(57) ABSTRACT

A hose arrangement for a motor vehicle may include a flexible elongated bellows including a plurality of radially orientated pleats and two axial longitudinal ends. The hose arrangement may also include at least one reinforcement rib which, on an outside, is coupled to a pleat tip of a respective pleat of the plurality of pleats in a material-bonded manner via two-component injection moulding. The at least one reinforcement rib may engage about the respective pleat in a circumferential direction. The at least one reinforcement rib may have at least two rib segments disposed following one another in the circumferential direction. Each of the at least two rib segments may radially cover the pleat tip by a segment angle of 30° to 310° in the circumferential direction.

20 Claims, 6 Drawing Sheets

(51) Int. Cl.
  *F16L 11/12*   (2006.01)
  *B60H 1/00*   (2006.01)
  *F16L 51/02*   (2006.01)
  *B29L 23/18*   (2006.01)

(58) Field of Classification Search
  USPC ....... 138/121, 122, 173, 141, 137, 172, 106, 138/177
  See application file for complete search history.

(56) References Cited

U.S. PATENT DOCUMENTS

| | | | | |
|---|---|---|---|---|
| 2004/0187947 | A1* | 9/2004 | Heo | F16L 11/111 |
| | | | | 138/121 |
| 2006/0162799 | A1* | 7/2006 | Goddard | F16L 11/15 |
| | | | | 138/121 |
| 2010/0037972 | A1* | 2/2010 | Palmeri | F16L 11/118 |
| | | | | 138/121 |
| 2012/0018024 | A1 | 1/2012 | Hagist et al. | |

FOREIGN PATENT DOCUMENTS

| | | |
|---|---|---|
| DE | 10 2010 032 220 A1 | 1/2012 |
| DE | 20 2013 100 893 U1 | 6/2014 |
| EP | 1233223 A2 | 8/2002 |

* cited by examiner

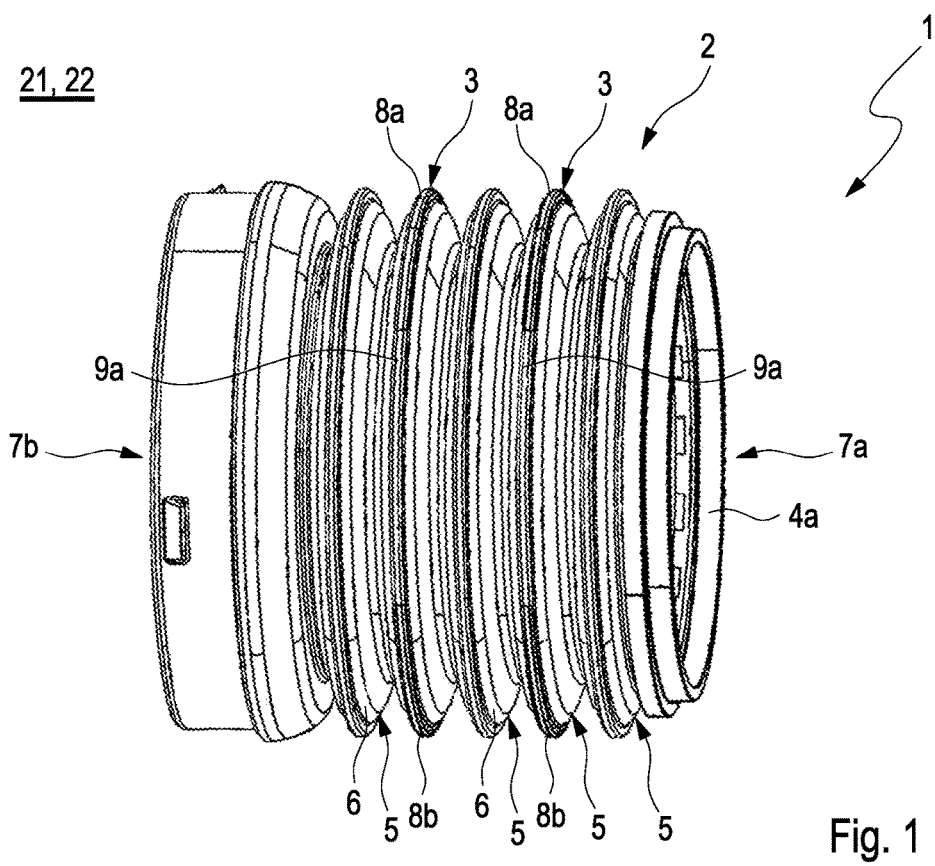
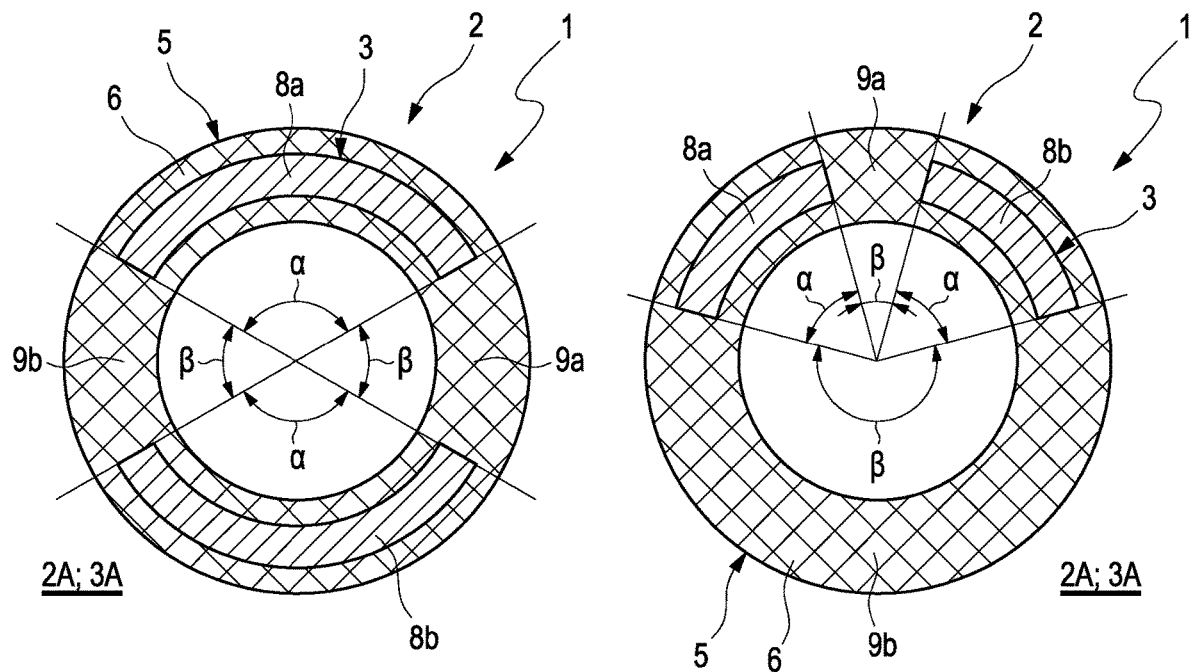
Fig. 1
Fig. 2
Fig. 3

HOSE ARRANGEMENT

CROSS-REFERENCE TO RELATED APPLICATION

This application claims priority to German Application No. DE 10 2018 208 123.9, filed on May 23, 2018, the contents of which are hereby incorporated by reference in its entirety.

TECHNICAL FIELD

The invention relates to a hose arrangement for a motor vehicle. The invention, furthermore, relates to a fresh air line equipped with such a hose arrangement and to a fresh air system for an internal combustion engine equipped with such a hose arrangement.

BACKGROUND

In a motor vehicle, components fixed to the motor and component fixed to the body are decoupled from one another in order to offset in particular relative movements between the internal combustion engine and the body of the motor vehicle. In the case of air-conducting lines, this is usually realised by a flexible elongated bellows having multiple radially orientated pleats. Here, the air-conducting lines are usually employed as a fresh air line in a fresh air system for an internal combustion engine in order to conduct raw or clean air to the internal combustion engine of the vehicle. Depending on technical requirements—temperature, movability, positive pressure, negative pressure, chemical resistance—different materials can be used for the bellows. Preferably, elastomers and in particular rubber are used since a bellows made of these materials is particularly thermally stable.

Disadvantageously, such a bellows of an air-conducting line can collapse under a negative pressure and has to be additionally supported by way of metallic support rings. Because of this, the production costs are significantly increased. Alternatively, the bellows with the support rings can be produced in a two-component injection moulding method such as for example is described in DE 20 2013 100 893 U1. Disadvantageously the production in this case is very expensive since a demoulding of the finished bellows with the stiff support ribs from the injection mould is possible with a disintegration core.

Coupling the bellows to components to be decoupled constitutes a further problem. For this purpose, metallic clamps are usually employed as a result of which the assembly and disassembly of the bellows are rendered more difficult. Furthermore, damaging the bellows at the coupling point with the clamp cannot be excluded.

SUMMARY

The object of the invention therefore is to state an improved or at least alternative embodiment for a hose arrangement having a flexible elongated bellows of the generic type or for a fresh air line equipped with such or for a fresh air system equipped with such, in the case of which the described disadvantages are overcome.

According to the invention, this object is solved through the subject of the independent claim(s). Advantageous embodiments are subject of the dependent claim(s).

A generic hose arrangement is suitable for a motor vehicle and comprises a flexible elongated bellows. Here, the bellows comprises multiple radially orientated pleats and two axial longitudinal ends. The hose arrangement, furthermore, comprises at least one reinforcement rib which on the outside is fixed to a pleat tip of the respective pleat by a two-component injection moulding method in a material-bonded manner and engages about the respective pleat in the circumferential direction. According to the invention, the reinforcement rib consists of at least two rib segments following one another in the circumferential direction, wherein the respective rib segment radially covers the respective pleat tip by a segment angle between 30° and 310° in the circumferential direction.

The hose arrangement according to the invention is preferentially an air-conducting line for conducting raw or clean air to the internal combustion engine of the motor vehicle. Air is usually supplied to an internal combustion engine by way of a fresh air system in which an air filtering device is located, which separates a raw side from a clean side. The raw air flows upstream of the filtering device and the clean air flows downstream of the filtering device. The terms "axial", "radial" and "in circumferential direction" therefore always relate to the longitudinal direction of the bellows, which is configured elongated and defines the longitudinal direction of the hose arrangement. According to the invention, two-component injection moulding method is to mean a method in which two materials—components—deviating in their properties from one another are joined into one component by injection moulding in a material-bonded manner. "Material-bonded" in this context means that the one material and the other material adhere to one another in the finished components by atomic or molecular forces and cannot be separated from one another in a non-destructive manner. In the two-component injection moulding method, a semi-finished product or multiple semi-finished products of the first material can for example be overmoulded with the second material in certain regions or completely and the finished component thereby produced. The semi-finished part or the multiple semi-finished parts can be produced by injection moulding or by another method.

The respective reinforcement rib according to the invention comprises at least two rib segments following one another in the circumferential direction. The respective rib segment radially covers the respective pleat tip by the segment angle between 30° and 310° in the circumferential direction. The rib segments of the respective reinforcement rib can radially cover the respective pleat tip by segment angles in the circumferential direction that deviate from one another or in other words are of identical or deviating design. For example, the reinforcement rib can comprise two identical rib segments each covering the segment angle equal to 170°, two identical rib segments each covering the segment angle equal to 120°, three identical rib segments each covering the rib segment angle equal to 90° or even four identical rib segments each covering the segment angle equal to 30°. In principle, further alternative versions with rib segments of deviating design or covering a deviating segment angle are conceivable. Altogether, the respective pleat can thus be protected almost completely or only in certain regions by the respective reinforcement rib in the circumferential direction by way of a totalised segment angle between 60° and 340°.

The hose arrangement according to the invention can comprise multiple reinforcement ribs which can be arranged on the pleats of the bellows in any order. Thus, the respective reinforcement pleats can be arranged for example on each or on every second pleat of the bellows. For example, each pleat can be supported by the reinforcement rib in a particularly stressed region of the bellows and every second pleat in a region of the bellows that is exposed to less stress. In principle, any regular or irregular order of the reinforcement ribs on the pleats of the bellows is conceivable. Advantageously, the bellows can thereby be locally protected from collapsing at a weak point created when utilising the hose arrangement.

Advantageously, the bellows can have a circular or oval or multiply curved bellows cross section. A rib cross section of the at least one reinforcement rib then corresponds to the bellows cross section of the bellows. Accordingly, the rib cross section corresponds to the bellows cross section and is circular or oval or multiply curved, so that the reinforcement rib in the circumferential direction has a material-bonded contact with the pleat tip of the respective pleat at any point or uninterruptedly. In this advantageous manner, the bellows can be configured as desired and effectively protected from collapsing. The at least one reinforcement rib can be formed from polyamide, in particular from hexamethylenediamine and adipic acid—also known as PA66. The bellows can be formed from an ethylene acrylate rubber—abbreviated AEM.

In a further development of the hose arrangement according to the invention it is advantageously provided that in the circumferential direction between the respective rib segments of the at least one reinforcement rib an expansion joint is formed in each case. The respective expansion joint extends over a joint angle between 10° and 290° in the circumferential direction. The respective expansion joints and the respective rib segments of the respective reinforcement rib alternate in the circumferential direction on the respective pleat. The respective expansion joints can extend in the circumferential direction over joint angles that deviate from one another or are the same. Within the respective expansion joint, the pleat tip of the pleat remains elastically deformable and during the deformation of the pleat within the expansion joint the rib segments of the respective reinforcement rib are also moveable relative to one another axially and/or radially and/or in the circumferential direction. The movability of the rib segments of the respective reinforcement rib relative to one another increases with the joint angle of the respective expansion joints. Advantageously, a demoulding of the hose arrangement following the two-component injection moulding method can thereby be simplified. Instead of a conventionally used decomposition core a solid core can be used, from which the hose arrangement can be demoulded by pulling over. Depending on the configuration of the respective reinforcement rib and of the respective rib segments, the expansion joins can extend over a totalised joint angle between 20° and 300° in the circumferential direction on the respective pleat.

Advantageously it can be provided that the at least one reinforcement rib lies against a surface of the respective pleat tip with an rib bonding surface, which is enlarged by way of multiple rib recesses directed radially to the outside and distributed in the circumferential direction. The at least one reinforcement rib consequently lies against the surface of the respective pleat tip with the enlarged rib bonding surface so that accordingly through the atomic or molecular bond between the bellows is reinforced on the respective pleat tip and the respective reinforcement rib adhering to the bellows in a material-bonded manner. In addition, the rib recesses are practically filled with the material of the bellows so that altogether a positively engaged structure can be formed. In particular, radial and/or axial undercuts can be provided in the respective rib recesses so that the bond or the cohesion of the bellows on the respective pleat tip and the at least one reinforcement rib is significantly increased radially and/or axially. Alternatively or additionally it can be also be provided that the at least one reinforcement rib has multiple rib openings axially penetrating the at least one reinforcement rib, which engage with complementarily formed pleat shapes on the pleat tip of the respective pleat. The rib openings and the pleat shapes can form a separate positively engaged structure or be integrated in the positively engaged structure of the rib recesses. Altogether, a detachment of the at least one reinforcement rib from the respective pleat tip of the bellows can be prevented in this way. Furthermore, materials which poorly adhere to one another can also be employed for the bellows and for the at least one reinforcement rib so that the production costs and the production effort can be reduced.

In an advantageous further development of the hose arrangement according to the invention it is provided that the hose arrangement comprises at least one flange piece which is axially joined to one of the respective longitudinal ends of the bellows and fixed to the same by way of a two-component injection moulding method. By way of the at least one flange piece, the hose arrangement can be coupled to components in the vehicle to be decoupled. By way of the flange pieces, the assembly and the disassembly of the bellows can be significantly simplified since a metallic clamp conventionally used for this purpose is no longer required. In addition, damage to the bellows at the coupling point between the bellows and the conventional clamp can also be prevented. Advantageously, the flange piece can be formed from polyamide, in particular from hexamethylenediamine and adipic acid—also known as PA66. The flange section made of PA66 makes possible welding the hose arrangement to line pipes made of PA66, as a result of which the production costs and the production effort can be reduced.

Advantageously, the at least one flange piece can lie against a surface of the bellows in the circumferential direction on the outside with a flange bonding surface, wherein the flange bonding surface is enlarged by way of multiple flange recesses which are radially directed to the outside and distributed in the circumferential direction. The at least one flange piece consequently lies against the surface of the bellows with the enlarged flange bonding surface so that accordingly the atomic or molecular bond between the bellows and the respective flange piece adhering to the bellows is reinforced. Here, the flange recesses are practically filled with the material of the bellows so that altogether a positively engaged structure can be formed. Advantageously, radial and/or axial undercuts can also be provided in the respective flange recesses which increase the bond or the cohesion of the bellows and the at least one flange piece radially and/or axially. Advantageously, a detachment of the at least one flange piece from the bellows can thereby be prevented. Furthermore, materials which poorly adhere to one another can also be employed for the bellows and for the at least one flange piece and the production costs and the production effort thereby reduced.

In order to simplify demoulding the hose arrangement, it can be advantageously provided that a diameter of the bellows steadily increases towards at least one of the longitudinal ends from a minimum diameter to a maximum diameter. Accordingly, a diameter of the flange piece can correspond to the maximum diameter of the bellows at the respective longitudinal end. In this way, the hose arrangement can be demoulded after the two-component injection moulding method at the opposite longitudinal end of the bellows, wherein instead of a conventionally used decomposition core a solid core can be used.

In summary, the hose arrangement according to the invention is effectively protected against collapsing by the at least one reinforcement rib and producing the hose arrangement is significantly simplified. In particular, demoulding of the hose arrangement by pulling over is possible so that no decomposition core during the production of the hose arrangement in a two-component injection moulding method is necessary any longer.

A fresh air line for a fresh air system for supplying an internal combustion engine with fresh air according to the invention comprises one or more line sections, wherein at least one line section is equipped with a hose arrangement of the type described above.

A fresh air system for supplying fresh air to an internal combustion engine according to the invention comprises an air filtering device, a raw-side fresh air line which feeds the raw air to the filtering device, a clean side fresh air line which conducts the clean air away from the filtering device and a hose arrangement of the type described above, wherein the hose arrangement is arranged in the raw-side fresh air line or in the clean-side fresh air line.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

FIG. 1 shows a view of a hose arrangement according to the invention with a bellows having multiple reinforcement ribs and having a flange piece;

FIGS. 2 to 6 show sectional views of a bellows of a hose arrangement according to the invention with varying bellows cross sections;

DETAILED DESCRIPTION

Figure 4:
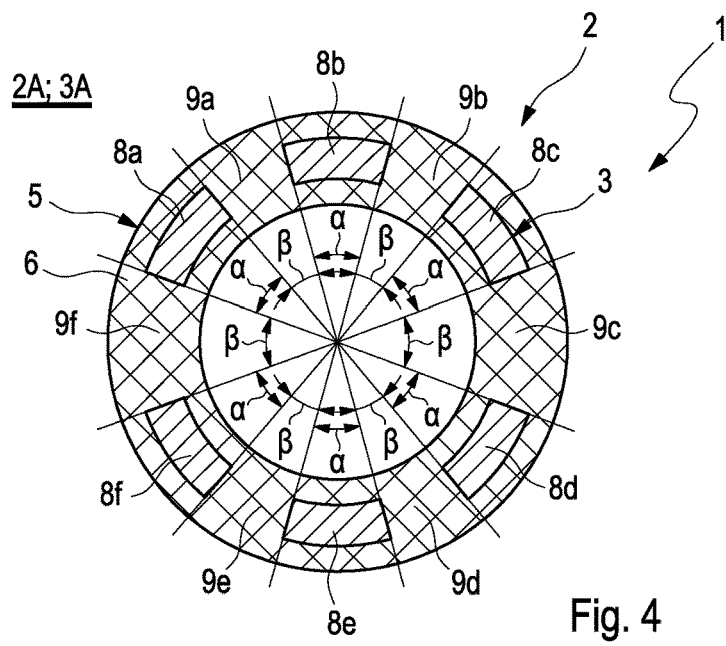

FIG. 1 shows a view of a hose arrangement 1 according to the invention for a motor vehicle having a bellows 2, having multiple reinforcement ribs 3 and having a flange piece 4a. The hose arrangement 1 can be a part of a fresh air line 21 for a fresh air system 22 for supplying an internal combustion engine with fresh air. The bellows 2 is designed flexibly and elongated and comprises multiple radially orientated pleats 5 each with a pleat tip 6 and two axial longitudinal ends 7a and 7b. The terms "axial" and "radial" and "in circumferential direction" here and thereafter relate to the longitudinal direction of the bellows 2. The reinforcement ribs 3 are fixed on the outside to the respective pleat tip 6 of the respective pleat 5 by a two-component injection moulding method in a material-bonded manner. The respective reinforcement rib 3 engages about the respective pleat 5 in the circumferential direction and protects the bellows 2 from collapsing. In this exemplary embodiment, the reinforcement ribs 3 are fixed to each second pleat 5 of the bellows 2. In principle, however, any regular or irregular order of the reinforcement ribs 3 on the pleats 5 of the bellows 2 is conceivable.

The respective reinforcement rib 3 in this exemplary embodiment consists of two rib segments 8a and 8b following one another in the circumferential direction, which in each case cover the respective pleat tip 6 radially in the circumferential direction. The rib segments 8a and 8b of the respective reinforcement rib 3 are separated in the circumferential direction in each case by an expansion joint 9a and 9b—not visible here—, which extend in the circumferential direction between the respective rib segments 8a and 8b. Within the expansion joints 9a and 9b, the pleat tip 6 of the pleat 5 remains elastically deformable and the rib segments 8a and 8b are moveable relative to one another within the respective expansion joint 9a and 9b during the deformation of the pleat tip 6. Because of this, a demoulding of the hose arrangement 1 after the two-component injection moulding method can be carried out in a simplified manner. In this exemplary embodiment, the rib segments 8a and 8b are designed identically but can also be designed so as to deviate from one another. The expansion joints 9a and 9b which are also designed identically in this exemplary embodiment can also have a design that deviates from one another.

The flange piece 4a is axially connected to the longitudinal end 7a of the bellows 2 and fixed to the same by a two-component injection moulding method in a material-bonded manner. The flange piece 4a can couple the hose arrangement 1 to components in the motor vehicle to be decoupled and by way of this the assembly and the disassembly of the hose arrangement 1 can be significantly simplified. At the longitudinal end 7b of the bellows 2, the hose arrangement 1 can be fixed to components in the motor vehicle to be decoupled by way of a conventional metallic clamp. The bellows 2 of the hose arrangement 1 can be formed for example from AEM and the respective reinforcement ribs 3 and the flange piece 4a can be formed for example from PA66.

FIG. 2 to FIG. 6 show sectional views through the respective pleat tip 6 in the bellows 2 of the hose arrangement 1 according to the invention. Here, the bellows 2 comprises deviating bellows cross sections 2A, 2B and 2C, wherein a rib cross section 3A, 3B and 3C of the respective reinforcement rib 3 corresponds to the respective bellows cross section 2A, 2B and 2C. By way of the corresponding rib cross section 3A, 3B or 3C, the reinforcement rib 3 has an uninterrupted material-bonded contact with the respective pleat tip 5 of the bellows 2 with the bellows cross section 2A, 2B or 2C.

In FIG. 2, the bellows 2 has a circular bellows cross section 2A and the reinforcement rib 3 a corresponding rib cross section 3A. In this exemplary embodiment, the reinforcement rib 3 comprises the rib segments 8a and 8b which cover the respective pleat tip 6 in each case by a segment angle α equal to 120°. The two rib segments 8a and 8b are divided by the expansion joints 9a and 9b which in each case extend over a joint angle β equal to 60° in the circumferential direction and follow the respective rib segment 8a and 8b in clockwise direction. The design shown in FIG. 2 also corresponds to the design of the bellows 2 and the reinforcement ribs 3 shown in FIG. 1.

In FIG. 3, the bellows 2 has the circular bellows cross section 2A and the reinforcement rib 3 the corresponding rib cross section 3A. Here, the reinforcement rib 3 has the rib segments 8a and 8b which are designed identically and in each case cover the respective pleat tip 6 by the segment angle α equal to 60°. The expansion joints 9a and 9b differ from one another and extend in the circumferential direction over the joint angle β equal to 30° and over the joint angle β equal to 210°.

In FIG. 4, the bellows 2 has the circular bellows cross section 2A and the reinforcement rib 3 the corresponding rib cross section 3A. Here, the reinforcement rib 3 has six rib segments 8a to 8f, which are designed identically and cover the respective pleat tip 6 in each case by the segment angle α equal to 30°. The expansion joints 9a to 9f differ from one another and extend in the circumferential direction over the joint angle β equal to 25° and over the joint angle β equal to 40°. Accordingly, the expansion joins 9a, 9b, 9d and 9c following the rib segments 8a, 8b, 8d and 8e in the clockwise direction radially extend over joint angles 13 equal to 25° and the expansion joints 9c and 9f following the rib segments 8c and 8f in the clockwise direction radially extend over joint angles 13 equal to 40°.

Figure 5:
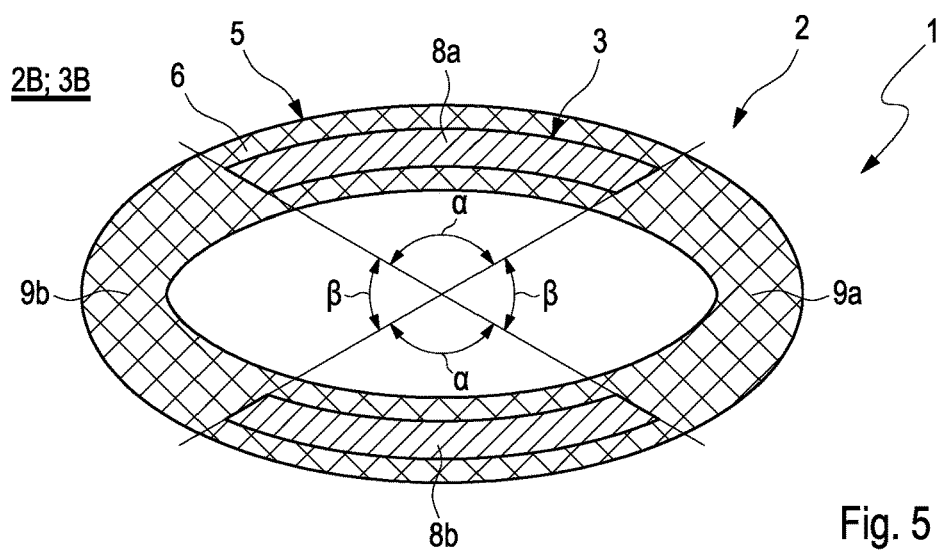

In FIG. 5, the bellows 2 has an oval bellows cross section 2B and the reinforcement rib 3 a corresponding rib cross section 3b. Here, the reinforcement rib 3 has the rib segments 8a and 8b which are designed identically and cover the respective pleat tip 6 in each case by the segment angle α equal to 120°. The expansion joints 9a and 9b are designed identically and extend in each case in the circumferential direction over the joint angle β equal to 60°.

Figure 6:
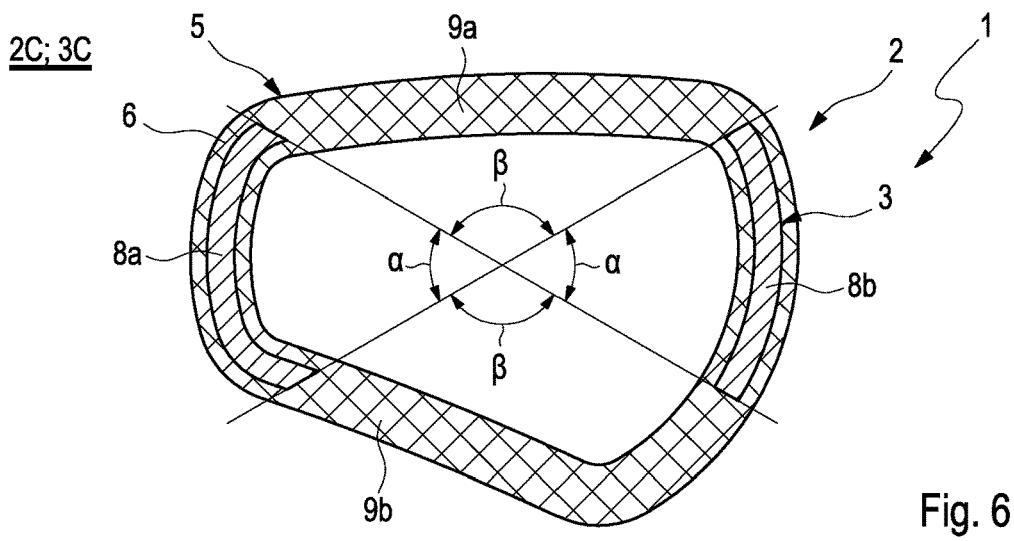

In FIG. 6, the bellows 2 has a multiply curved irregular bellows cross section 2C and the reinforcement rib has a corresponding rib cross section 3C. Here, the reinforcement rib 3 comprises the rib segments 8a and 8b which in each case cover the respective pleat tip 6 by the segment angle α equal to 120°. The expansion joints 9a and 9b extend in circumferential direction in each case over the joint angle β equal to 60°.

Figure 7:
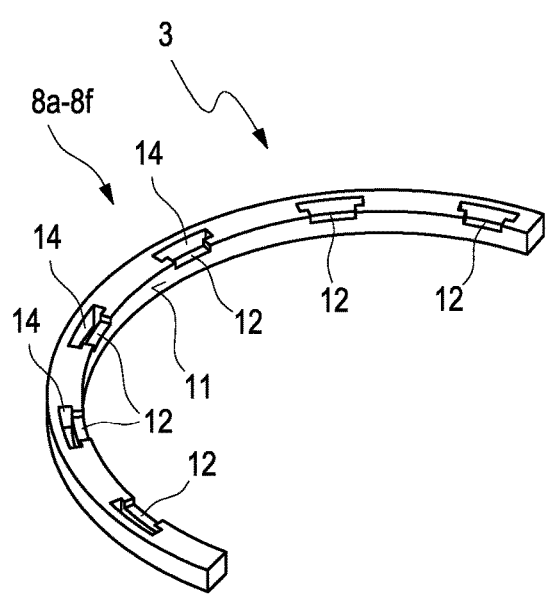
FIG. 7 shows a view of a rib segment of a reinforcement rib.
Figure 8:
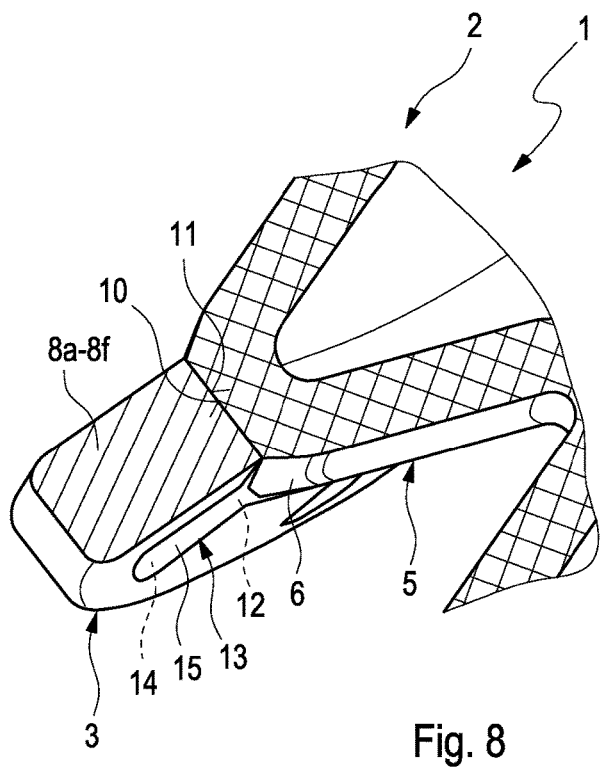
FIG. 8 shows a sectional view of a pleat with the rib segment according to FIG. 7.

FIG. 7 shows a view of one of the rib segments 8a-8f of the reinforcement rib 3. In FIG. 8, a sectional view of the bellows 2 with the rib segment 8a-8f shown in FIG. 7 is shown. According to FIG. 8, the rib segment 8a-8f of the reinforcement rib 3 lies against a surface 10 of the pleat tip 6 with a rib bonding surface 11. Here, the rib bonding surface 11 is enlarged through multiple rib recesses 12 directed radially to the outside and distributed in the circumferential direction. Accordingly, the atomic or molecular bond between the bellows 2 on the pleat tip 6 and the respective rib segment 8a-8f of the reinforcement rib 3 adhering to the bellows 2 in a material-bonded manner is also enlarged. In addition, the rib recesses 12 are filled with the material of the bellows 2 so that a positively engaged structure 13 is formed. The positively engaged structure 13 advantageously improves the bond of the bellows 2 to the respective pleat tip 6 and the rib segment 8a-8f of the reinforcement rib 3. In addition, the rib segment 8a-8f of the reinforcement rib 3 comprises multiple axially penetrating rib openings 14 which engage with complementarily formed pleat shapes 15 on the pleat tip 6 of the respective pleat 5. Here, the rib openings 14 are formed in the rib recesses 12 and because of this integrated in the positively engaged structure 13. Altogether, a detachment of the rib segment 8a-8f of the reinforcement rib 3 from the respective pleat tip 6 of the bellows 2 can be prevented in this advantageous manner.

Figure 9:
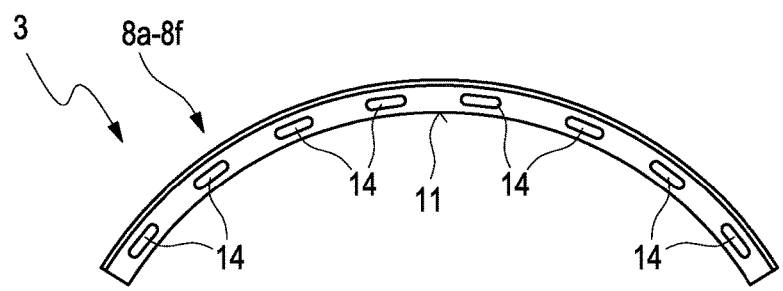
FIG. 9 shows a view of a rib segment of a reinforcement rib.
Figure 10:
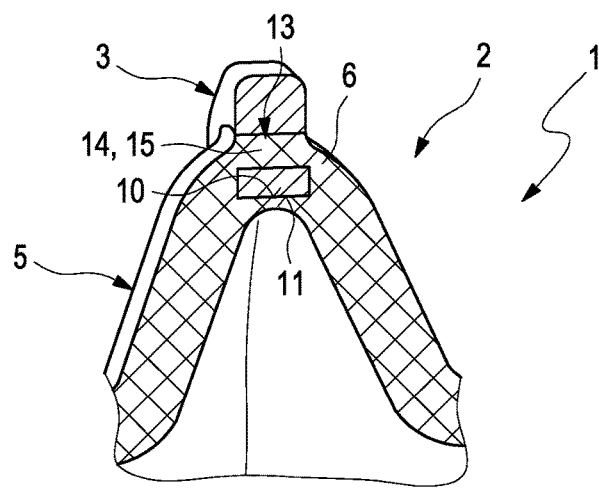
FIG. 10 shows a sectional view of a pleat with the rib segment according to FIG. 9.

FIG. 9 shows a view of one of the rib segments 8a-8f of the reinforcement rib 3 in a deviating embodiment. In FIG. 10, a sectional view of the bellows 2 with the rib segment 8a-8f shown in FIG. 9 is shown. Here, the rib segment 8a-8f of the reinforcement rib 3 exclusively comprises the multiple axially penetrating rib openings 14 which engage with the complementarily formed pleat shapes 15 on the pleat tip 6 of the respective pleat 5. Here, the positively engaged structure 13 is exclusively formed by the rib openings 14 and the pleat shapes 15.

Figure 11:
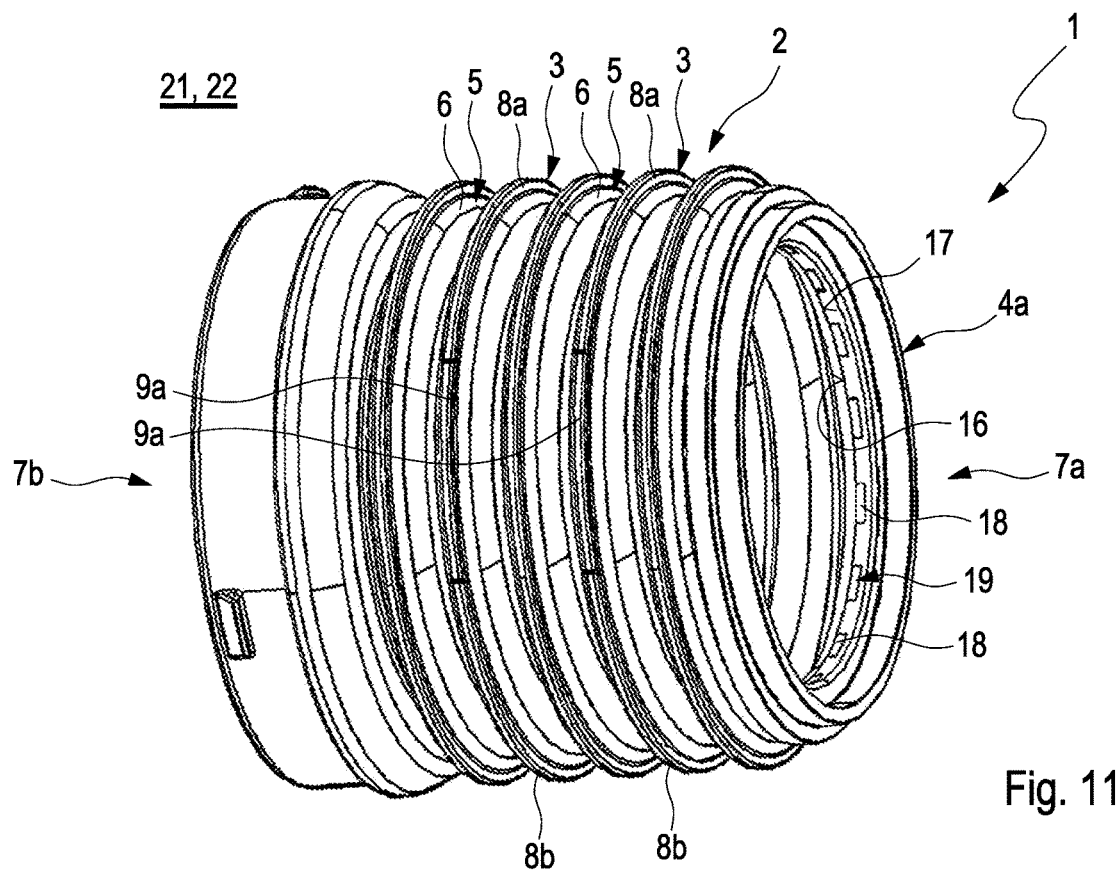
FIG. 11 shows a view of a hose arrangement according to the invention with a bellows having multiple reinforcement ribs and having a flange piece.
Figure 12:
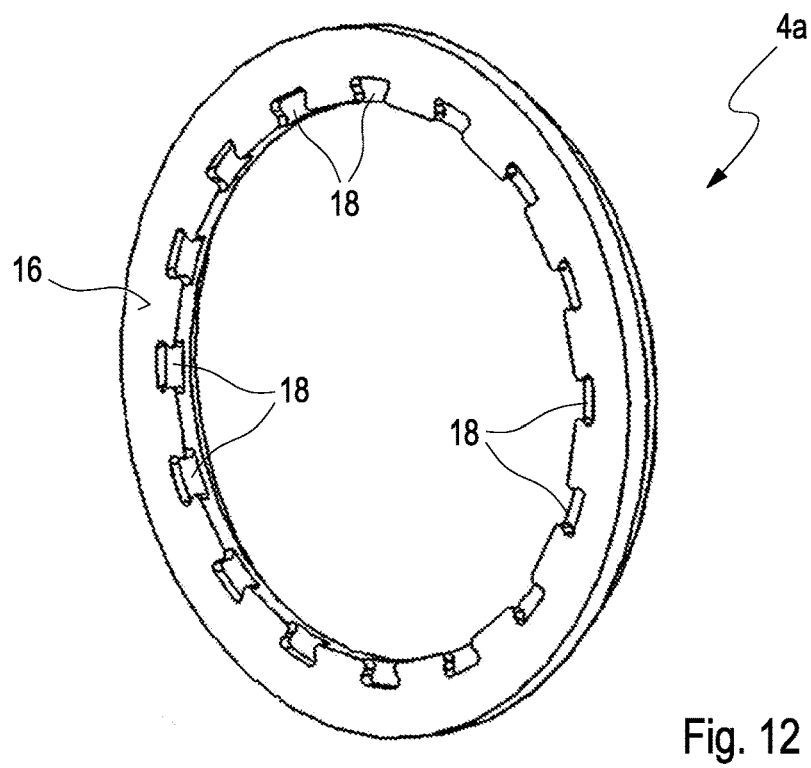
FIG. 12 shows a view of the flange piece of the hose arrangement shown in FIG. 11.
Figure 13:
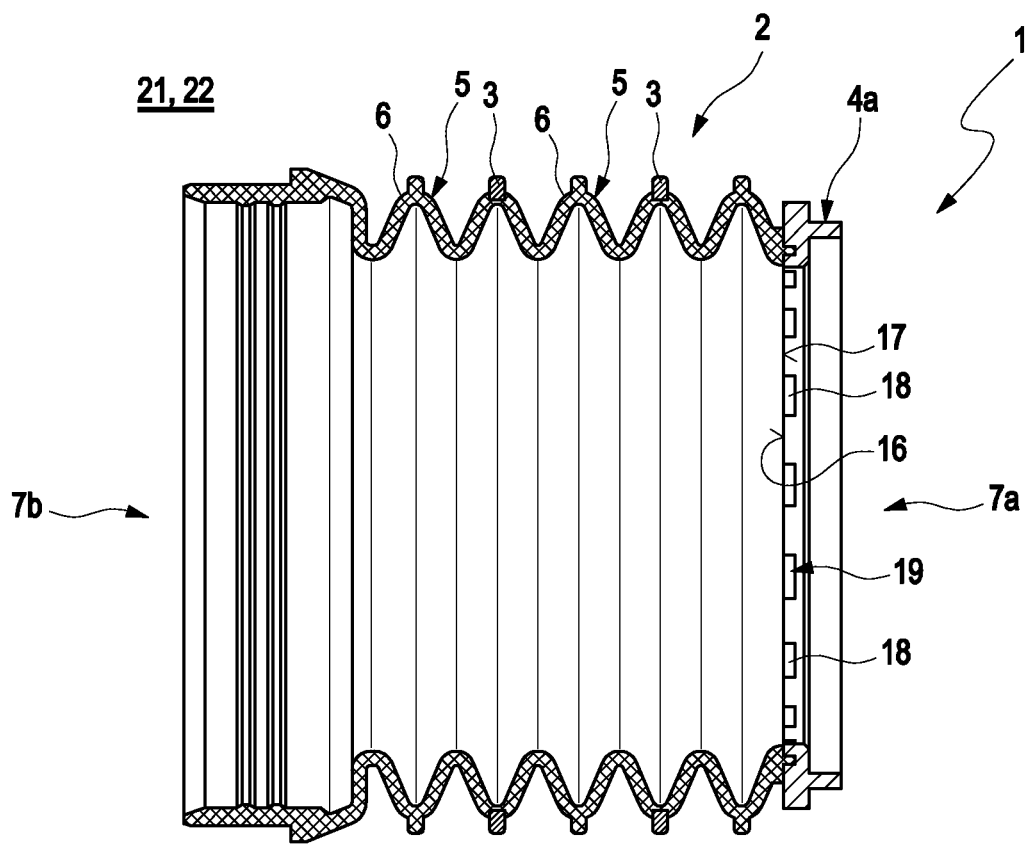
FIG. 13 shows a sectional view of the hose arrangement shown in FIG. 11.

FIG. 11 shows a view of the hose arrangement 1 according to the invention as it is also shown in FIG. 1. FIG. 12 shows the flange piece 4a of the hose arrangement 1 shown in FIG. 11 and FIG. 13 shows the hose arrangement 1 shown in FIG. 11 in section. In the hose arrangement 1, the flange piece 4a is axially connected to the longitudinal end 7a of the bellows 2 and fixed to the same in a two-component injection moulding method in a material-bonded manner. Here, the flange piece 4a with a flange bonding surface 16 lies against a surface 17 of the bellows 2 on the outside in the circumferential direction. The flange bonding surface 16 is enlarged through multiple flange recesses 18 radially directed to the outside and distributed in the circumferential direction and accordingly the atomic or molecular bond between the bellows 2 and the respective flange piece 4a adhering to the bellows 2 in a material-bonded manner, reinforced. The flange recesses 18 are filled with the material of the bellows 2 and form a positively engaged structure 19. By way of undercuts in the flange recesses 18, the positively engaged bond of the bellows 2 and of the flange piece 4a is additionally improved. Altogether, a detachment of the flange piece 4a from the bellows 2 can be prevented in this advantageous manner.

Figure 14:
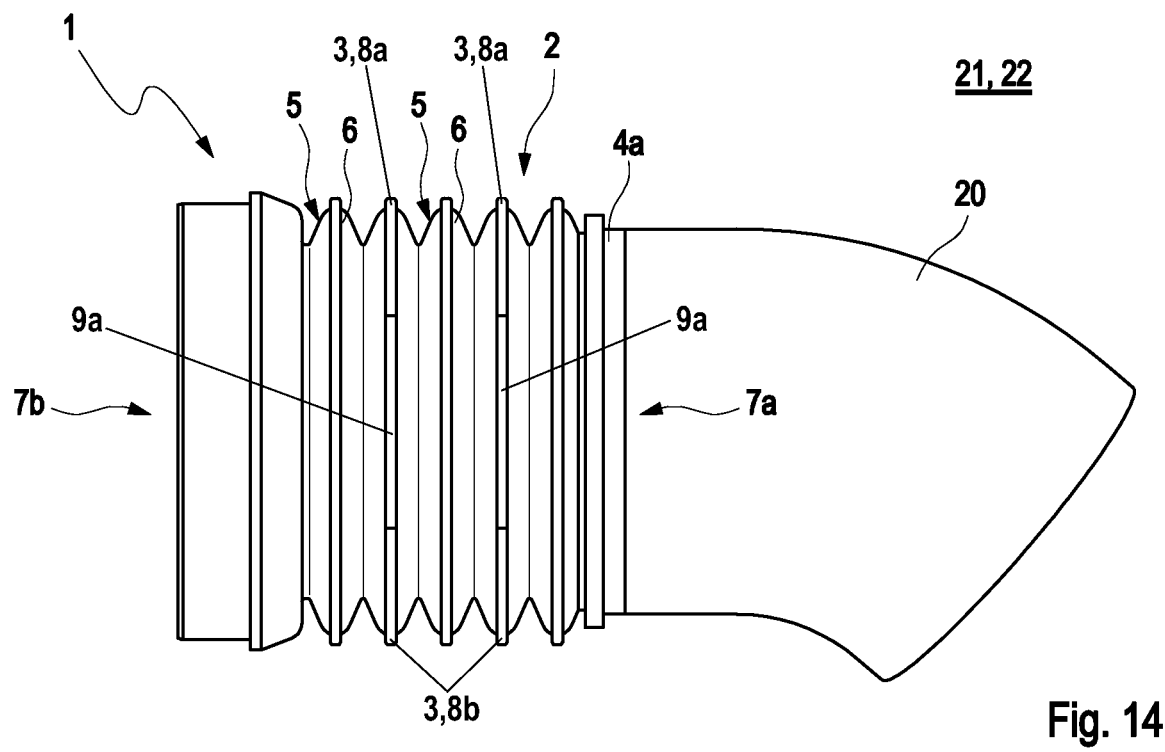
FIG. 14 shows a view of the hose arrangement shown in FIG. 11 with a line pipe.

FIG. 14 shows a view of the hose arrangement 1 shown in FIG. 11 and FIG. 13 with a line pipe 20 which is fixed to the flange piece 4a. The flange piece 4a and the line pipe 20 can be formed for example from PA66 and welded together.

Figure 15:
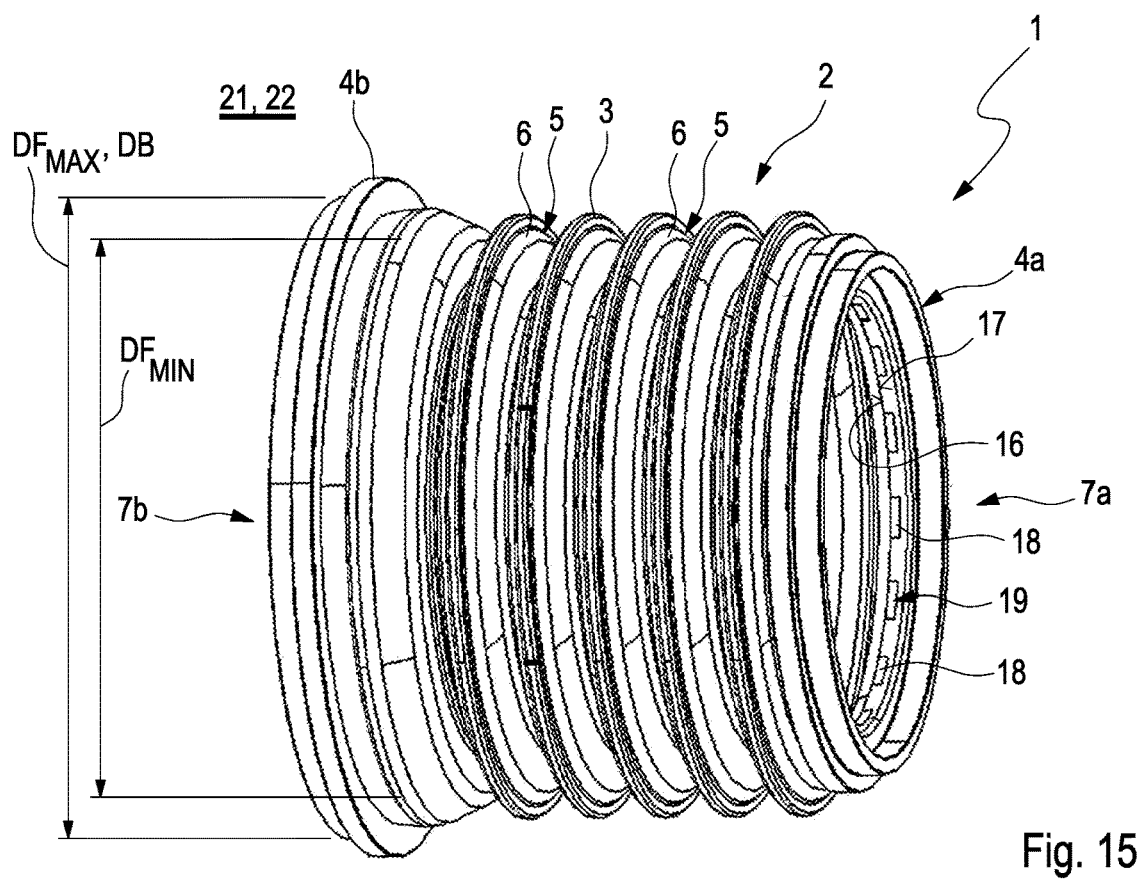
FIG. 15 shows a view of a hose arrangement according to the invention with two flange pieces of deviating design.

FIG. 15 shows a view of the hose arrangement 1 according to the invention, wherein in this case a further flange piece 4b is fixed to the longitudinal end 7b of the bellows 2 in a two-component injection moulding method in a manner that is identical to that of the flange piece 4a. A diameter of the bellows 2 in this case steadily increases towards the longitudinal end 7b from a minimum diameter $DF_{MIN}$ to a maximum diameter $DF_{MAX}$. The flange piece 4b designed deviates from the flange piece 4a and has a diameter DB corresponding to the maximum diameter $DF_{MAX}$ in order to simplify a demoulding of the hose arrangement 1 in the two-component injection moulding method.

Figure 16:
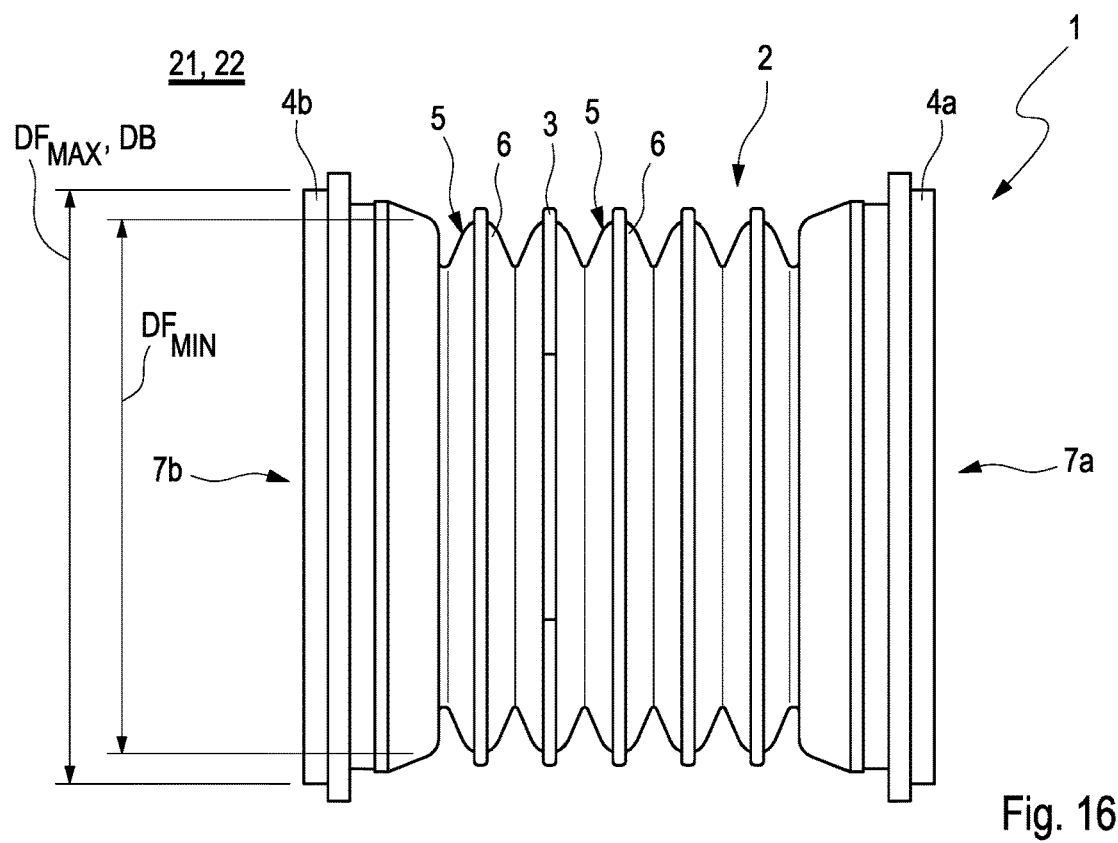
FIG. 16 shows a view of a hose arrangement according to the invention with two flange pieces of identical design.

FIG. 16 shows a view of the hose arrangement 1 according to the invention, wherein in this case the flange piece 4a and the flange piece 4b are identical in design. A diameter of the bellows 2 in this case steadily enlarges towards the longitudinal ends 7a and 7b from the minimum diameter $DF_{MIN}$ to the maximum diameter $DF_{MAX}$. The flange pieces 4a and 4b each have a diameter DB corresponding to the maximum diameter $DF_{MAX}$ in order to simplify a demoulding of the hose arrangement 1 in the two-component injection moulding method.

In summary, the hose arrangement 1 according to the invention is effectively protected by the reinforcement ribs 3 against a collapsing during the negative pressure. Furthermore, a demoulding of the hose arrangement 1 in the two-component injection moulding method can be performed more easily and because of this the production costs and the production effort reduced.

The invention claimed is:

1. A hose arrangement for a motor vehicle, comprising:
   a flexible elongated bellows including a plurality of radially orientated pleats and two axial longitudinal ends; and
   at least one reinforcement rib which, on an outside, is coupled to a pleat tip of a respective pleat of the plurality of pleats in a material-bonded manner via two-component injection moulding and engages about the respective pleat in a circumferential direction;
   wherein the at least one reinforcement rib has at least two rib segments disposed following one another in the circumferential direction, and wherein each of the at least two rib segments radially covers the pleat tip by a segment angle of 30° to 310° in the circumferential direction.

2. The hose arrangement according to claim 1, further comprising at least two expansion joints arranged in the circumferential direction between the at least two rib segments of the at least one reinforcement rib, wherein each of the at least two expansion joints extends over a joint angle of 10° to 290° in the circumferential direction.

3. The hose arrangement according to claim 1, wherein the at least one reinforcement rib lies against a surface of the pleat tip via a rib bonding surface having a plurality of rib recesses extending radially towards the outside and distributed over the circumferential direction.

4. The hose arrangement according to claim 1, wherein the at least one reinforcement rib includes a plurality of rib openings axially penetrating the at least one reinforcement rib, which engage with a plurality of complementarily structured pleat shapes arranged on the pleat tip of the respective pleat.

5. The hose arrangement according to claim 1, wherein at least one of:
   the at least one reinforcement rib is composed of polyamide; and
   the bellows is composed of an ethylene acrylate rubber.

6. The hose arrangement according to claim 1, wherein:
   the bellows has one of a circular, an oval, and a multiple curved bellows cross section; and
   a rib cross section of the at least one reinforcement rib corresponds to the bellows cross section of the bellows.

7. The hose arrangement according to claim 1, further comprising at least one flange piece axially connected to one of the two longitudinal ends of the bellows and coupled thereto in a material-bonded manner via two-component injection moulding.

8. The hose arrangement according to claim 7, wherein the at least one flange piece has a flange bonding surface lying against a surface of the bellows on the outside in the circumferential direction, and wherein the flange bonding surface includes a plurality of flange recesses radially extending to the outside and distributed in the circumferential direction.

9. The hose arrangement according to claim 7, wherein the at least one flange piece is composed of polyamide.

10. The hose arrangement according to claim 1, wherein a diameter of the bellows steadily increases to at least one of the two longitudinal ends from a minimum diameter to a maximum diameter.

11. A fresh air line for a fresh air system for supplying an internal combustion engine with fresh air, comprising at least one line section and a hose arrangement connected to the at least one line section, the hose arrangement including:
   a flexible elongated bellows including a plurality of radially orientated pleats and two axial longitudinal ends; and
   at least one reinforcement rib which, on an outside, is coupled to a pleat tip of a respective pleat of the plurality of pleats in a material-bonded manner via two-component injection moulding and engages about the respective pleat in a circumferential direction;
   wherein the at least one reinforcement rib has at least two rib segments disposed spaced apart from one another in the circumferential direction, and wherein each of the at least two rib segments radially covers the pleat tip by a segment angle of 30° to 310° in the circumferential direction.

12. A fresh air system for supplying fresh air to an internal combustion engine comprising an air filtering device including a raw-side fresh air line structured and arranged to supply raw air to the filtering device, a clean side fresh air line structured and arranged to lead clean air away from the filtering device, and a hose arrangement arranged in at least one of the raw-side fresh air line and the clean side fresh air line, the hose arrangement including:
   a flexible elongated bellows including a plurality of radially orientated pleats and two axial longitudinal ends; and
   at least one reinforcement rib which, on an outside, is coupled to a pleat tip of a respective pleat of the plurality of pleats in a material-bonded manner via two-component injection moulding and engages about the respective pleat in a circumferential direction;
   wherein the at least one reinforcement rib has at least two rib segments disposed following one another in the circumferential direction, and wherein each of the at least two rib segments radially covers the pleat tip by a segment angle of 30° to 310° in the circumferential direction.

13. The fresh air system according to claim 12, further comprising at least two expansion joints arranged on the pleat tip in an alternating manner with the at least two rib segments in the circumferential direction, each of the at least two expansion joints extending over a joint angle of 10° to 290° in the circumferential direction.

14. The fresh air system according to claim 12, wherein a rib bonding surface of the at least one reinforcement rib lies against a surface of the pleat tip, the rib bonding surface having a plurality of rib recesses extending radially away from the bellows.

15. The fresh air system according to claim 12, wherein the at least one reinforcement rib includes a plurality of rib openings axially penetrating the at least one reinforcement rib and engaging a plurality of complementarily structured pleat shapes arranged on the pleat tip of the respective pleat.

16. The fresh air system according to claim 12, wherein the bellow has one of a circular, an oval, and a multiple curved shaped radial cross section.

17. The hose arrangement according to claim 1, wherein the at least one reinforcement rib is composed of polyamide and the bellows is composed of an ethylene acrylate rubber.

18. The hose arrangement according to claim 1, wherein the at least one reinforcement rib is composed of hexamethylenediamine and adipic acid.

19. The hose arrangement according to claim 1, further comprising at least two expansion joints arranged on the pleat tip in an alternating manner with the at least two rib segments in the circumferential direction, each of the at least two expansion joints extending over a joint angle of 10° to 290° in the circumferential direction.

20. The hose arrangement according to claim 1, wherein the at least two rib segments are arranged on the pleat tip spaced apart from one another in the circumferential direction.

\* \* \* \* \*